(12) United States Patent
Stainken et al.

(10) Patent No.: US 11,934,641 B1
(45) Date of Patent: Mar. 19, 2024

(54) USER INTERFACE CUSTOMIZATION BASED ON NAVIGATIONAL SIGNALS

(71) Applicant: Amazon Technologies, Inc., Seattle, WA (US)

(72) Inventors: Dennis Ryan Stainken, Newport Beach, CA (US); Alexander Slutsker, Seattle, WA (US); Raman Bhatia, Seattle, WA (US); Sylvia Yang, Lake Forest Park, WA (US); Puneet Sharma, Kenmore, WA (US); Peter Everett Zupke, Seattle, WA (US); Ksenia Zhizhimontova, Seattle, WA (US); Aparna Raman, Seattle, WA (US); Anton Pieter van der Stroom, Bothell, WA (US); Steven Ivie, Salt Lake City, UT (US); Michaela Lea Rodwick, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 17/710,153

(22) Filed: Mar. 31, 2022

(51) Int. Cl.
*G06F 3/048* (2013.01)
*G06F 3/0482* (2013.01)
*G06F 3/0484* (2022.01)
*G06F 9/451* (2018.01)

(52) U.S. Cl.
CPC ......... *G06F 3/0484* (2013.01); *G06F 3/0482* (2013.01); *G06F 9/451* (2018.02)

(58) Field of Classification Search
None
See application file for complete search history.

(56) References Cited

U.S. PATENT DOCUMENTS

| 2012/0004954 | A1* | 1/2012 | Eisinger | G06Q 30/0207 705/14.1 |
| 2014/0157145 | A1* | 6/2014 | Bush | G06Q 50/01 715/745 |
| 2014/0280176 | A1* | 9/2014 | Berk | G06F 16/9535 707/740 |
| 2015/0363500 | A1* | 12/2015 | Bhamidipati | G06F 3/04842 707/722 |

* cited by examiner

*Primary Examiner* — Thanh T Vu
(74) *Attorney, Agent, or Firm* — Kilpatrick Townsend & Stockton LLP

(57) ABSTRACT

User interface customization based on user navigational signals is described herein. A computer system causes a device to present first information associated with a first item in a first network page. The computer system receives first data indicating a first interaction with the first information and determines whether the first interaction corresponds to a first request for information about a set of items associated with the first item or to a second request for a removal of the presentation of the first information. If the first interaction corresponds to the first request, the computer system causes the device to present a second network page that shows second information associated with a second item of the set of items. If the first interaction corresponds to the second request, the computer system causes the device to remove the first information from being presented in the first network page.

20 Claims, 15 Drawing Sheets

US 11,934,641 B1

USER INTERFACE CUSTOMIZATION BASED ON NAVIGATIONAL SIGNALS

BACKGROUND

Different device modalities are available for presenting and interacting with information. For example, the information can be organized in an arrangement of graphical user interface (GUI) elements. A user interaction with a GUI element can result in changing the presentation of the information.

BRIEF DESCRIPTION OF THE DRAWINGS

Various embodiments in accordance with the present disclosure will be described with reference to the drawings, in which.

DETAILED DESCRIPTION

Figure 1:
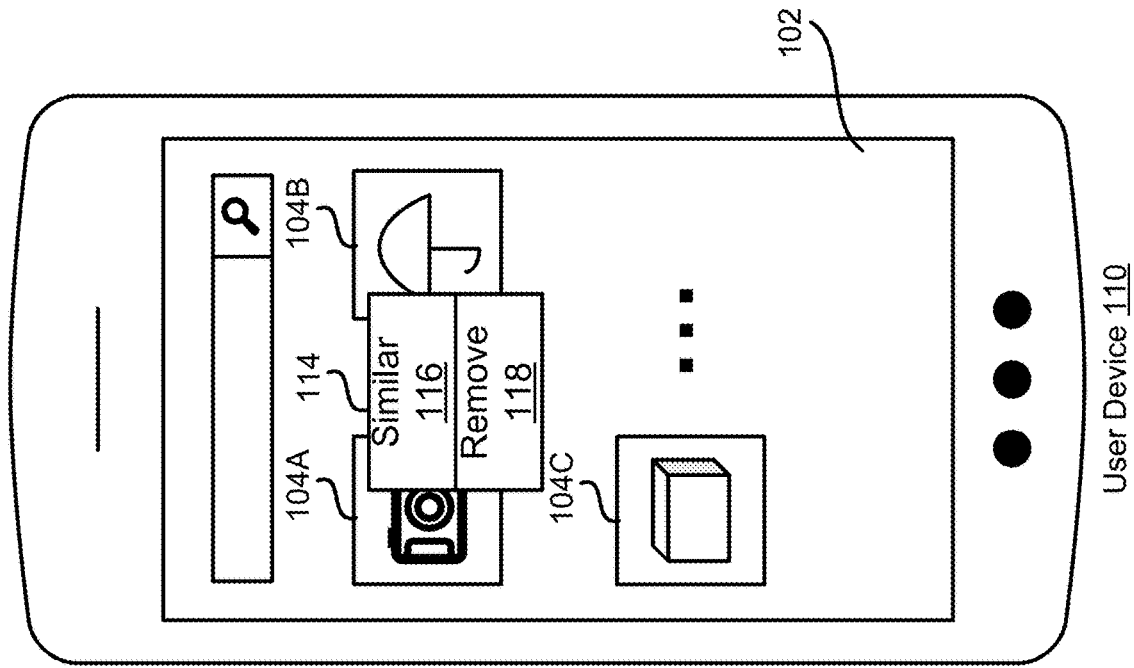
FIG. 1 illustrates an example of a device displaying a menu for user interface customization, according to embodiments of the present disclosure.
Figure 1:
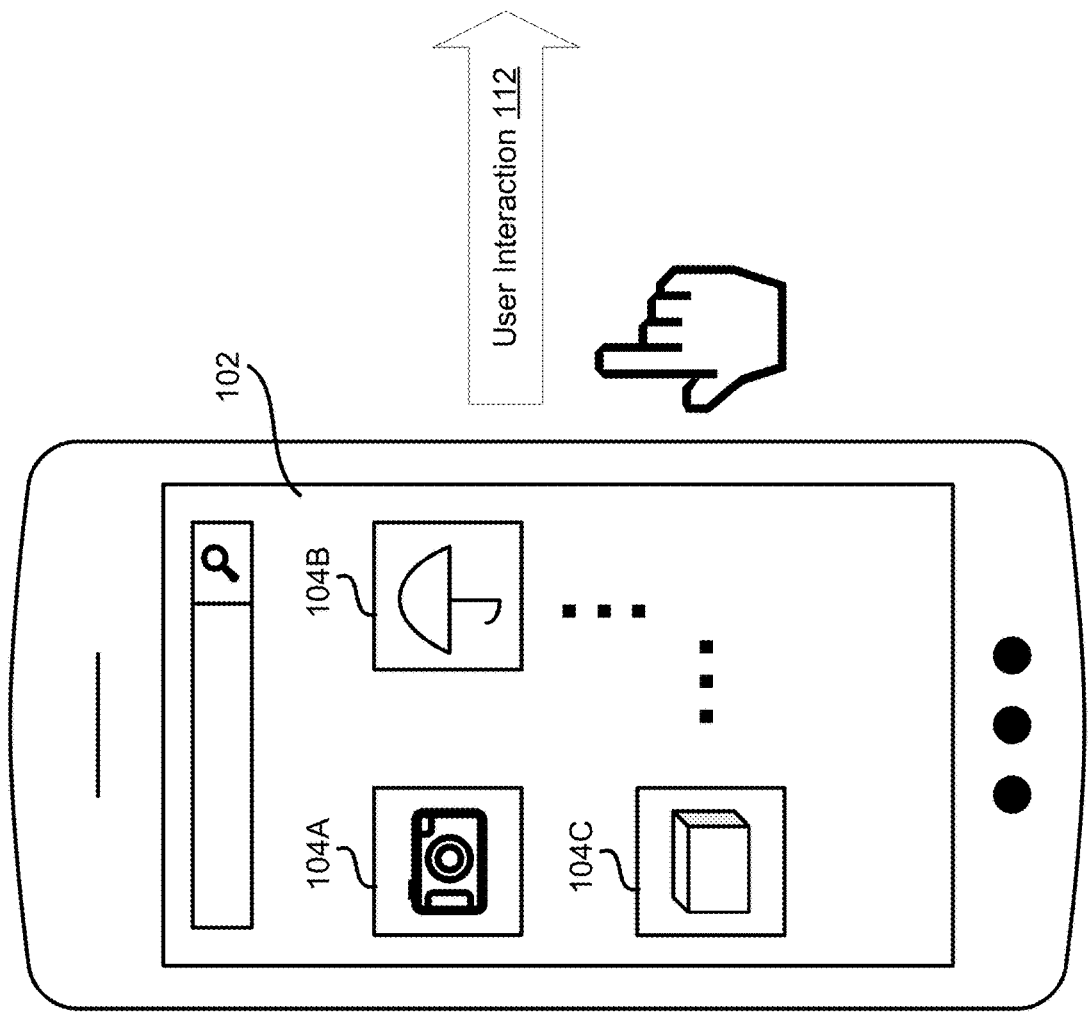

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, customizing a user interface based on navigational signals. For instance, a device can be associated with a user account and in communication with a computer system. The computer system can cause the device to present information (e.g., text and/or an image) associated with an item in a first network page. A user can interact with the information, which can generate data that indicates the interaction. Based on the data, the computer system can determine whether the interaction corresponds to a first request for information about a set of items similar to the item or to a second request for a removal of the presentation of the information. If the interaction corresponds to the first request, the computer system can cause the device to present a second network page that shows the information and additional information associated with another item of the set of items. Alternatively, if the interaction corresponds to the second request, the computer system can cause the device to remove the information from being presented in the first network page, and the computer system can include a first identifier of the item in a list of removed items, which is associated with the user account.

To illustrate, consider an example of a smartphone that includes a touchscreen display. Through a graphical user interface (GUI) of the smartphone, the user can navigate to a webpage associated with a marketplace that offers items for sale. The user can browse images of items presented at the GUI. If the user wants to provide feedback on an item, such as a television, the user may long press on the image to see options associated with the item. A computer system in communication with the device can cause an option menu with the options to be presented based on the long press on the image of the television. For example, the option menu can include options of "see similar items" and "remove item". If the user selects to see similar items, the computer system can cause a bottom action sheet, or other modal window, to be presented over the webpage. The bottom action sheet presents items similar to the television. Alternatively, if the user selects to remove the item, the computer system can remove the image of the television from the webpage and replace it with an image of a different item, such as a blender. The computer system may cause a bottom action sheet to be presented over the webpage requesting a reason for the removal. In addition, the computer system can also add the television to a list of removed items so that the television is not presented to the user again until a removal criterion is met. For instance, the removal criteria may involve the user indicating that the television is to be removed from the list of removed items or the television being on the list of removed items for a particular period of time.

Embodiments of the present disclosure provide several technical advantages over conventional devices. For instance, the embodiments provide a user interface configured for receiving explicit positive and negative feedback on presented information and adjusting (e.g., customizing) the current and future information presentation based on the feedback, thereby improving the overall GUI experience. Additionally, regardless of whether the feedback is negative or positive, the feedback can be received from a single webpage, which reduces the computing and user complexity of typical feedback reception. Further, feedback can be collected from multiple devices and aggregated. Negative feedback related to an item or topic can indicate an issue. Information about the item may no longer be presented until the issue is resolved, thereby adjusting the information source (e.g., the content server from which the information can be retrieved and presented) based on the feedback.

FIG. 1 illustrates an example of a device displaying a menu for user interface customization, according to embodiments of the present disclosure. The device is a user device 110 that includes a GUI 102. While the user device 110 is illustrated as a smartphone that supports a touch input modality, the user device 110 may alternatively be a laptop, personal computer, tablet, or other device capable of presenting item information at a GUI. The user device 110 is capable of supporting various computing services including, for instance, information retrieval from information sources (e.g., webpages from web servers) and display operations (e.g., presentation of webpages in a web browser). In particular, the user device 110 includes one or more processors, one or more memories storing computer-readable instructions, one or more network interfaces, and/or other computing components.

A user can navigate to a network page, such as a webpage, that is presented at the GUI 102. The user device 110 can be associated with a user account. For example, the network page can be a webpage presenting item information about various items. The webpage can be associated with a marketplace that offers the items for sale and the user can have a user account associated with the marketplace. The item information can be organized in tiles at the GUI 102, as illustrated in FIG. 1. But other representations of item information are also possible. The item information is illustrated as including images of items in FIG. 1. As illustrated, image 104A is an image of a camera, image 104B is an image of an umbrella, and image 104C is an image of a container. Although not shown in FIG. 1, the item information may additionally or alternatively include text corresponding to the item.

In an example, the user device 110 can receive a user interaction 112 with one of the images 104A-C or in a proximity of one of the images 104A-C. The user interaction 112 may be a long press on the image, a scroll over or click on a menu icon, or a swipe of the image in a particular direction. For example, for the user device 110, the user interaction 112 can be a long press on the image 104A. Data associated with the user interaction 112 may be sent to a server that then sends response data to the user device 110 that causes the user device 110 to present an option menu 114 at the GUI 102 and in association with the image 104A. Alternatively, the user device 110 itself may cause the user device 110 to present the option menu 114 in response to the user interaction 112 (e.g., by caching the various information that the server would provide and executing logic for presenting the information). The option menu 114 includes a first option 116 that is selectable to request information about items that are similar to the camera of image 104A. The option menu 114 also includes a second option 118 that is selectable to request a removal of the presentation of the image 104A of the camera.

The user can provide another interaction with either the first option 116 or the second option 118. The display of the GUI 102 can vary depending on whether the interaction is with the first option 116 or the second option 118. For example, if the first option 116 is selected, the user device 110 can present a first modal window over the webpage. The first modal window can show the information about the camera and information about at least one similar item. If the second option 118 is selected, the user device 110 can remove the image 104A of the camera from being presented in the webpage. The user device 110 can also present a second modal window over the webpage. The second modal window may request a removal reason. The user device 110 can include an identifier of the camera in a list of removed items that is associated with the user account. The first modal window associated with the first option 116 and the second modal window associated with the second option 118 are further described in FIGS. 3-6.

The GUI 102 provides capability for processing an interaction with the first option 116 or the second option 118 in a single network page. That is, regardless of which option is selected, the functionality of the similar items process or the item removal process can be performed from within the original network page. Therefore, computing power associated with loading a new network page may be reduced. In addition, the usability of the GUI is improved since the user can provide explicit positive and negative feedback of items within the single network page. So, there is no need to navigate to multiple network pages to provide feedback. As a result of the feedback, items presented can be customized for each user account, ultimately resulting in a better GUI experience for the user.

Herein forward, embodiments are described with presenting and interacting with webpages. However, the embodiments are not limited as such and similarly apply to network pages. A webpage is available from a website and is an example of a network page available from a network storage (e.g., a network server). Whereas the webpage is presented by a browser, a network page can be presented by an application executing on a device (the browser being an example of the application). Whereas a web interface is used to retrieve the webpage from a web server, an application programming interface (API) can be used to retrieve the network page by the application from the network server. The functionalities related to presenting and interacting with webpages are similar to the functionalities related to presenting and interaction with network pages.

Figure 2:
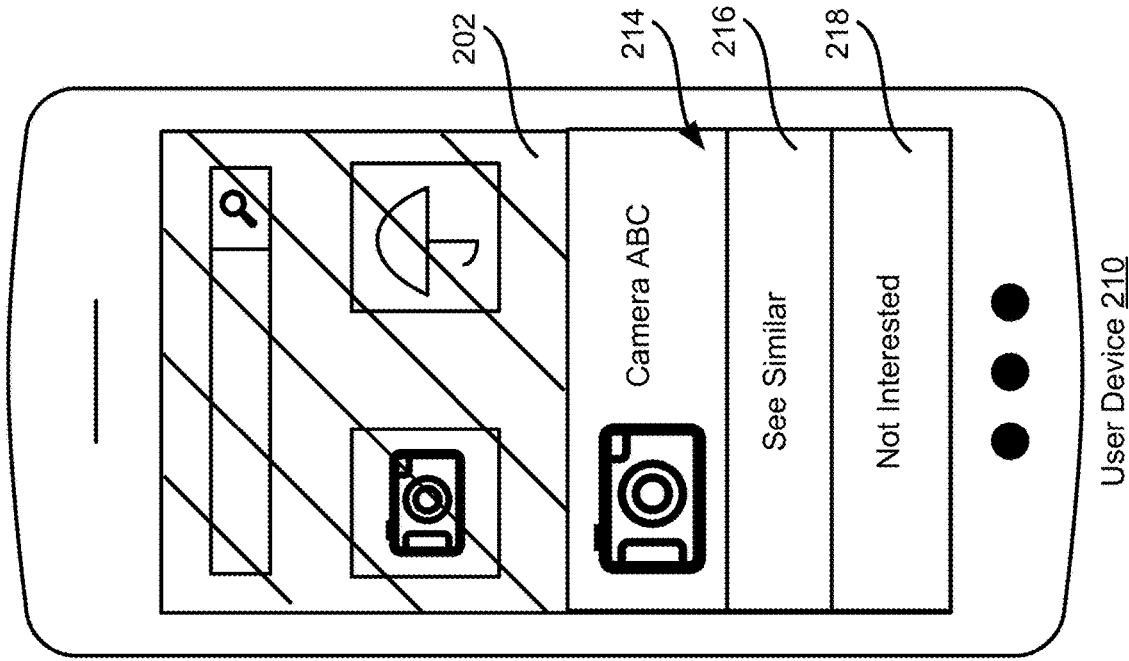
FIG. 2 illustrates another example of a device displaying a menu for user interface customization, according to embodiments of the present disclosure.
Figure 2:
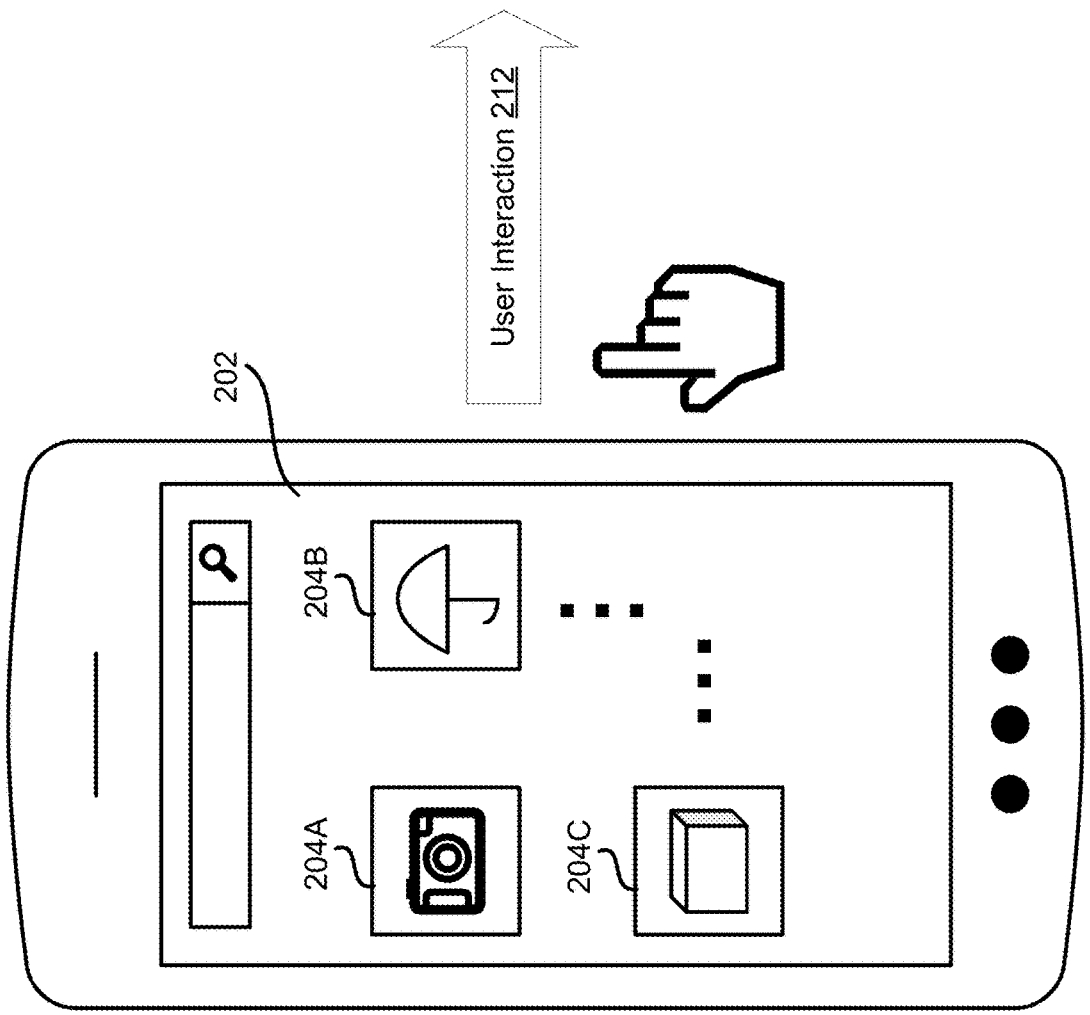

FIG. 2 illustrates another example of a device displaying a menu for user interface customization, according to embodiments of the present disclosure. Similar to FIG. 1, the device is a user device 210 that includes a GUI 202. A user navigates to a webpage that is presented at the GUI 202. The user device 210 can be associated with a user account. Item information is organized in tiles at predetermined locations of the GUI 202. The item information is illustrated as including images of items. As illustrated, image 204A is an image of a camera, image 204B is an image of an umbrella, and image 204C is an image of a container. Although not shown in FIG. 2, the item information may additionally or alternatively include text corresponding to the item.

In an example, the user device 210 can receive a user interaction 212 with one of the images 204A-C or in a proximity of one of the images 204A-C. The user interaction 212 may be a long press on the image, a scroll over or click on a menu icon, or a swipe of the image in a particular direction. For example, for the user device 210, the user interaction 212 can be a long press on the image 204A. Data associated with the user interaction 212 may be sent to a server that then sends response data to the user device 210 that causes the user device 210 to present an option menu 214 at the GUI 202 and in association with the image 204A. Alternatively, the user device 210 itself may cause the user device 210 to present the option menu 214 in response to the user interaction 212. The option menu 214 is illustrated as a bottom action sheet overlaid over the tiles of images. The option menu 214 includes a first option 216 that is selectable to request information about items that are similar to the camera of image 204A. The option menu 214 also includes a second option 218 that is selectable to request a removal of the presentation of the image 204A of the camera.

The user can provide another interaction with either the first option 216 or the second option 218. The display of the GUI 202 can vary depending on whether the interaction is with the first option 216 or the second option 218. For example, if the first option 216 is selected, the user device 210 can present a first modal window over the webpage. The first modal window can show the information about the camera and information about at least one similar item. If the second option 218 is selected, the user device 210 can remove the image 204A of the camera from being presented in the webpage. The user device 210 can also present a second modal window over the webpage. The second modal window may request a removal reason. The user device 210 can include an identifier of the camera in a list of removed items that is associated with the user account. The first modal window associated with the first option 216 and the second modal window associated with the second option 218 are further described in FIGS. 3-6.

Figure 3:
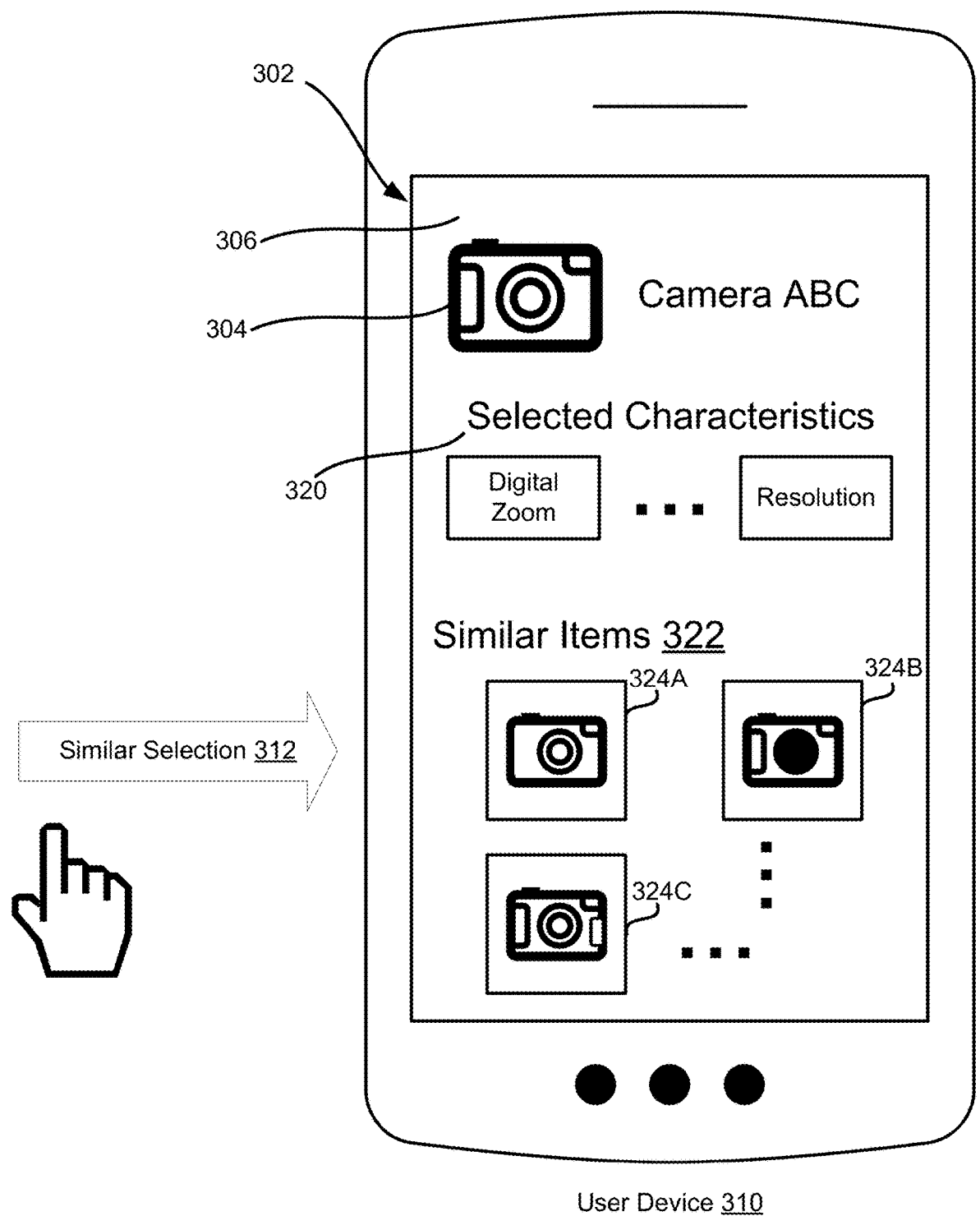
FIG. 3 illustrates an example of a display after a similar item selection, according to embodiments of the present disclosure.

FIG. 3 illustrates an example of a display after a similar item selection, according to embodiments of the present disclosure. The GUI 302 includes a modal window 306 that can be a webpage presented over the webpage in FIGS. 1 and 2. In the modal window 306, the user device 310 can pin a presentation of information about the selected item to a predefined location in the webpage. For instance, the similar selection 312 can be received for image 104A in FIG. 1, corresponding to the camera. So, the image 304 (and any additional item information) corresponding to the same camera, is pinned to a predefined location of the modal window 306. In FIG. 3, the predefined location is a top portion of the modal window 306.

The modal window 306 also includes a presentation of similar items 322. Each of images 324A-C correspond to item information about items that are similar to the camera of image 304. The similar items 322 are arranged in tiles in the modal window 306, but other presentations are also possible. A user can provide an interaction with any of the images 324A-C to open a new webpage and see additional information about the item.

In an example, the modal window 306 can also include a filter option 320 that allows filtering of one or more of the similar items 322 to the image 304. The filter option 320 can include multiple characteristics of the item of the image 304 for which the filtering can be based on. For example, since the image 304 is a camera, the filter option 320 is illustrated as including characteristics of digital zoom and resolution. Upon receiving a selection of one or more of the characteristics, the similar items 322 presented in the modal window 306 can be updated based on the selection.

The presentation of the similar items 322 can allow the user to quickly see and compare other similar alternatives to the selected item based on the user's unique preferences. For example, if the user is presented a personalized recommender widget for gardening products, the presentation of the similar items 322 can present personalized recommendations with options to filter based on "Budget Friendly", "Eco Friendly", "From Brands you Trust", and other personalized filters. Each of these items or widgets can also have "See similar" options that assist with further narrowing of the search, which is a fast alternative to typing in search keywords to attempt to find the similar items.

Figure 4:
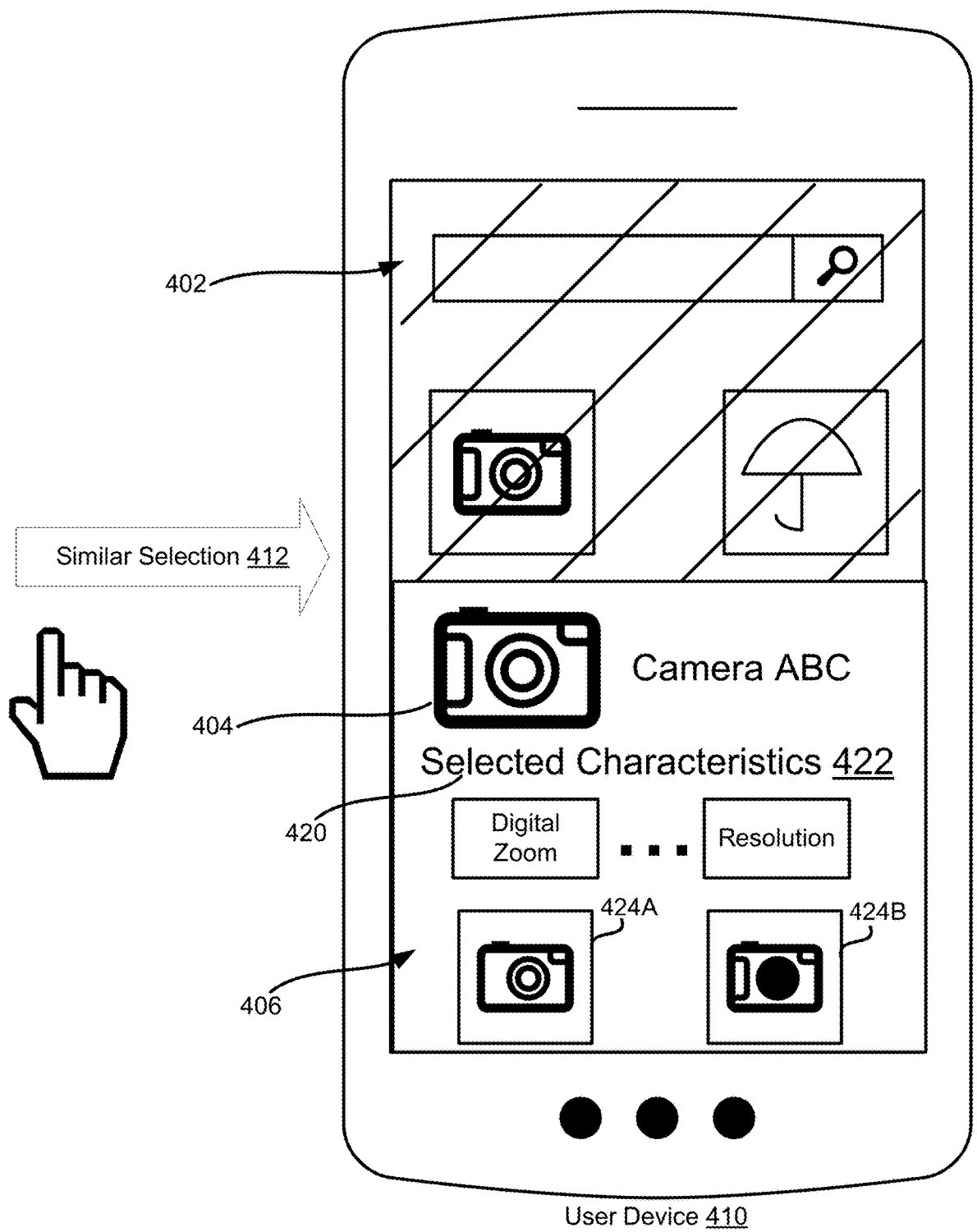
FIG. 4 illustrates another example of a display after a similar item selection, according to embodiments of the present disclosure.

FIG. 4 illustrates another example of a display after a similar item selection, according to embodiments of the present disclosure. Similar to FIG. 3, the GUI 402 includes a modal window 406 that can presented over the webpage in FIGS. 1 and 2. The modal window 406 is illustrated as a bottom action sheet. The user device 410 can pin a presentation of information about the selected item to a predefined location in the modal window 406. For instance, the similar selection 412 can be received for image 104A in FIG. 1, corresponding to the camera. So, the image 404 (and any additional item information) corresponding to the same camera, is pinned to a predefined location of the modal window 406. In FIG. 4, the predefined location is a top portion of the modal window 406.

The modal window 406 also includes a presentation of similar items 422. Each of images 424A-B correspond to item information about items that are similar to the camera of image 404. The similar items 422 are arranged in tiles in the modal window 406, but other presentations are also possible. A user can provide an interaction with either of the images 424A-B to open a new webpage and see additional information about the item.

In an example, the modal window 406 can also include a filter option 420 that allows filtering of one or more of the similar items 422 to the image 404. The filter option 420 can include multiple characteristics of the item of the image 404 for which the filtering can be based on. For example, since the image 404 is a camera, the filter option 420 is illustrated as including characteristics of digital zoom and resolution. Upon receiving a selection of one or more of the characteristics, the similar items 422 presented in the modal window 406 can be updated based on the selection.

Figure 5:
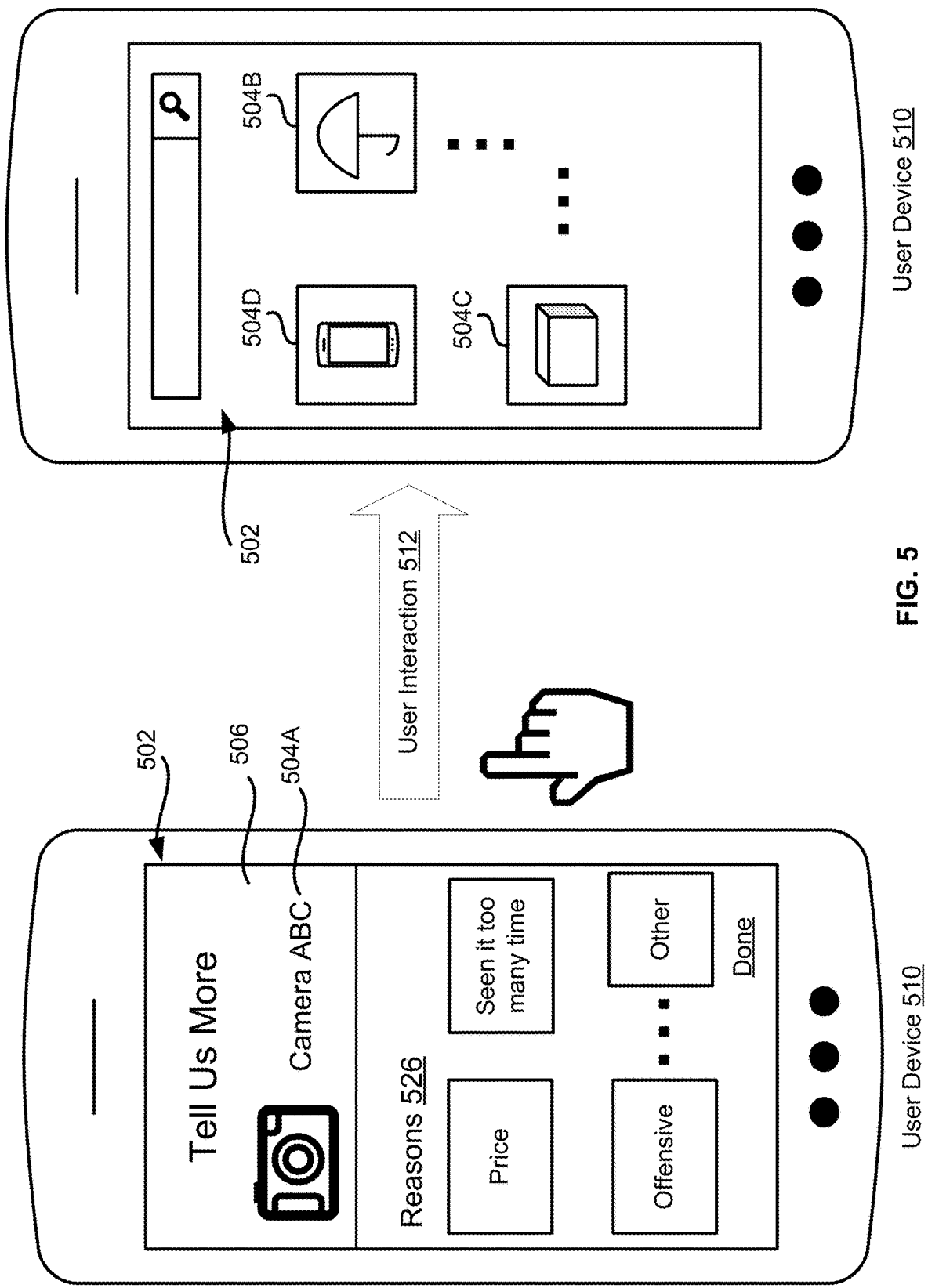
FIG. 5 illustrates an example of a display after a removal selection, according to embodiments of the present disclosure.

FIG. 5 illustrates an example of a display after a removal selection, according to embodiments of the present disclosure. After the user interaction of a removal selection, user device 510 can present a GUI 502 with a modal window 506. The modal window 506 can be a webpage presented over the webpage in FIGS. 1 and 2. In the modal window 506, the user device 510 can pin a presentation of information about the removed item to a predefined location in the webpage. For instance, the removal selection can be received for image 104A in FIG. 1, corresponding to the camera. So, the image 504A (and any additional item information) corresponding to the same camera, is pinned to a predefined location of the modal window 506. In FIG. 5, the predefined location is a top portion of the modal window 506. Alternatively, the image 504A with item information for the camera may not be presented in the modal window 506, and instead the image 504A may be removed from the GUI 502.

The modal window 506 can include a request for a removal reason 526. The request may be presented at a predefined location of the modal window 506. For example, if the image 504A is presented in the modal window 506, the request for a removal reason can be presented below the image 504A. A user can provide an interaction with the request, such as selecting a reason for their removal selection of the item in the image 504A. As illustrated, possible removal reasons include a price of the item, being shown the item too many times, the item being offensive, or another reason. The reasons 526, or an ordering of the presentation of the reasons 526 via a user interface of the user device 510 can be personalized based on the user. User data about past interactions with a webssite (or, more generally, a network resource), including browsing history, clicks, taps, purchases, removal selections, similar selections, etc. can be stored and fed that into a machine learning model that determines which reasons to present and/or how to arrange the presentation of the reasons. Once the user has selected one or more of the removal reasons 526, the user can provide a user selection 512 to select a "done" (or similar) feature in the modal window 506.

In an example, the GUI 502 can then present the original webpage of FIGS. 1 and 2, but the image 504A can be replaced with a new image 504D of a different item. Images 504B-C can remain in their original locations of the webpage. The user can then proceed with viewing and interacting with the images 504B-D in the original webpage.

Figure 6:
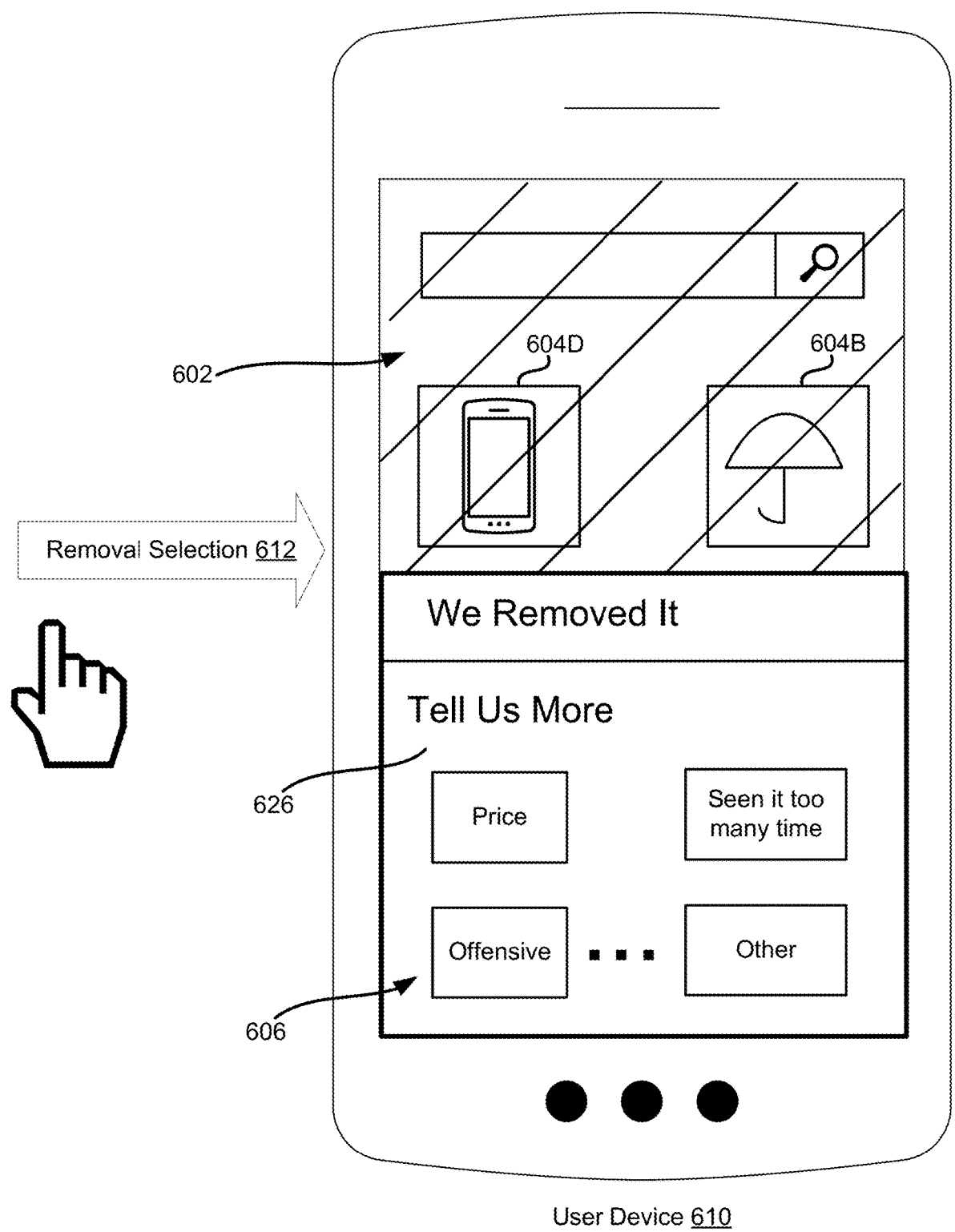
FIG. 6 illustrates another example of a display after a removal selection, according to embodiments of the present disclosure.

FIG. 6 illustrates another example of a display after a removal selection, according to embodiments of the present disclosure. After the removal selection 612, user device 610 can present a GUI 602 with a modal window 606. The modal window 606 can be a bottom action sheet presented over the webpage in FIGS. 1 and 2. The removal selection 612 can be a selection to remove image 104A in FIG. 1 corresponding to a camera. Upon receiving the removal selection 612, the user device 610 can replace image 104A and replace with a new image 604D of a different item, illustrated as a phone. Images 604B can remain in its original location of the webpage.

The modal window 606 can include a request for a removal reason 626. The request may be presented at a predefined location of the modal window 606. A user can provide an interaction with the request, such as selecting a reason for their removal selection 612 of the item in the image 104A. As illustrated, possible removal reasons include a price of the item, being shown the item too many times, the item being offensive, or another reason. Once the user has selected one or more of the removal reasons 626, the user can provide another user selection to exit out of the request. For example, the user selection can be a tap on the GUI 602 outside of the modal window 606. The user can then proceed with viewing and interacting with the images 604B-C, and other images, in the original webpage.

Figure 7:
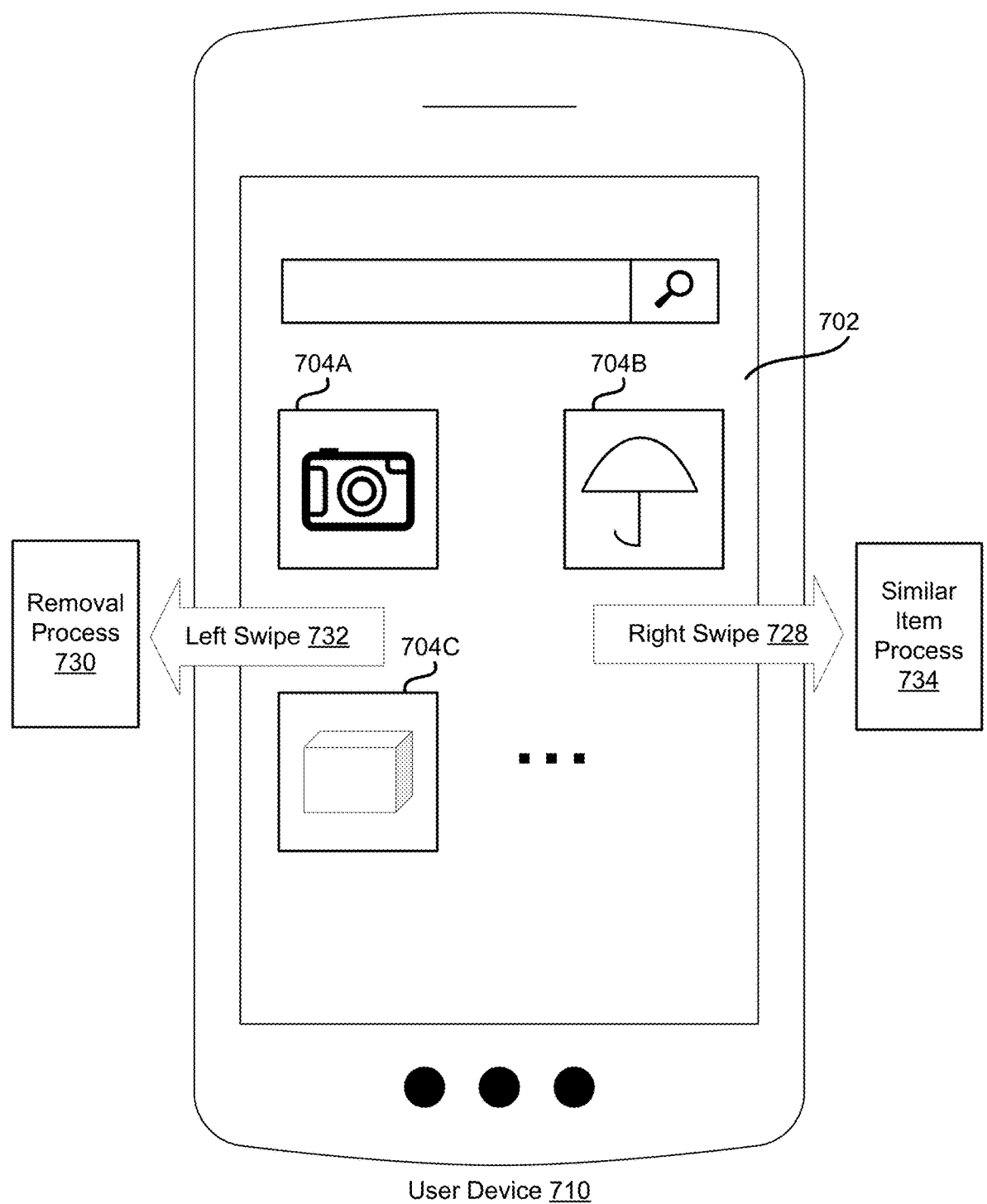
FIG. 7 illustrates an example of navigating a display for user interface customization, according to embodiments of the present disclosure.

FIG. 7 illustrates an example of navigating a display for user interface customization, according to embodiments of the present disclosure. A user device 710 includes a GUI 702. A user can navigate to a network page, such as a webpage, that is presented at the GUI 702. The user device 710 can be associated with a user account. For example, the network page can be a webpage presenting item information about various items. The webpage can be associated with a marketplace that offers the items for sale and the user can have a user account associated with the marketplace. The item information can be organized in tiles at the GUI 702, as illustrated in FIG. 7. But other representations of item information are also possible. The item information is illustrated as including images of items in FIG. 7. As illustrated, image 704A is an image of a camera, image 704B is an image of an umbrella, and image 704C is an image of a container. Although not shown in FIG. 7, the item information may additionally or alternatively include text corresponding to the item.

In an example, ingress to a similar item process 734 or a removal process 730 can occur without an option menu being presented at the GUI 702. The user device 710 can receive a user interaction with one of the images 704A-C or in a proximity of one of the images 704A-C. The user interaction 112 may be a swipe of the image in a particular direction. For example, the user interaction can be a right swipe 728 on the image 704A. Data associated with the right swipe 728 may be sent to a server that then sends response data to the user device 710 that causes the user device 710 to enter the similar item process 734 in association with the image 704A, as described in FIGS. 3 and 4. Alternatively, the user interaction can be a left swipe 732 on the image 704A. Data associated with the left swipe 732 may be sent to a server that then sends response data to the user device 710 that causes the user device 710 to enter the removal process 730 in association with the image 704A, as described in FIGS. 5 and 6.

In an example, the user device 710 can receive a user interaction via a voice command associated with one of the images 704A-C. For instance, the user interaction can be a voice command of "show items similar to the camera". Data associated with the voice command may be sent to a server for natural language processing (e.g., including automatic speech recognition (ASR) and natural language understanding (NLU)) among other types of processing, where the server then sends response data to the user device 710 that causes the user device 710 to enter the similar item process 734 in association with the image 704A. Alternatively, the user interaction can be a voice command of "remove the camera". Data associated with the voice command may be sent to the server for also natural language processing among other types of processing, where the server then sends response data to the user device 710 that causes the user device 710 to enter the removal process 730 in association with the image 704A.

Figure 8:
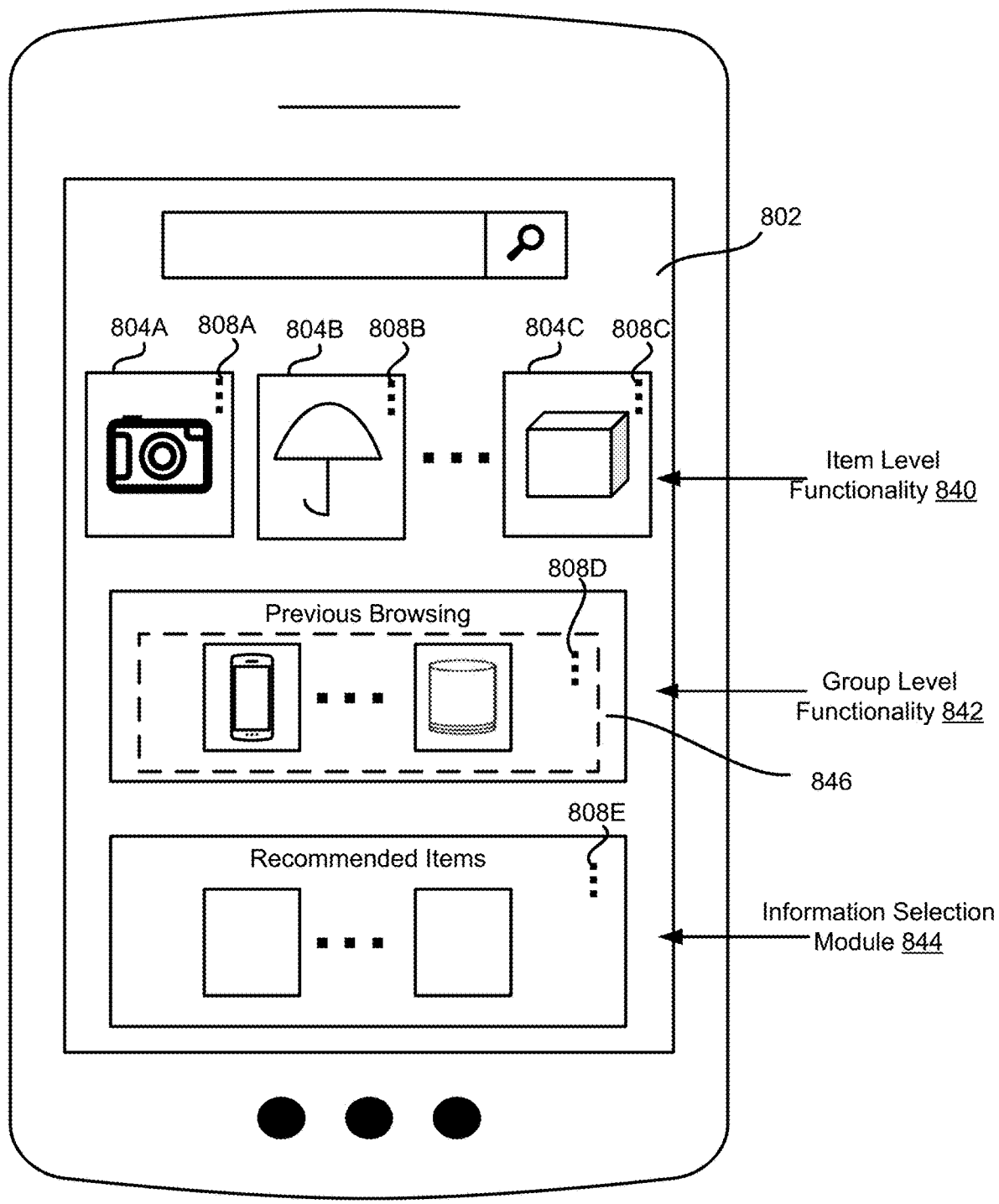
FIG. 8 illustrates an example of levels of item removal, according to embodiments of the present disclosure.

FIG. 8 illustrates an example of levels of item removal, according to embodiments of the present disclosure. A GUI 802 of a user device 810 presents information about various items to a user associated with the user device 810. The GUI 802 includes multiple levels of functionality for the presentation of the items. For example, the GUI 802 can include an item level functionality 840 for presenting information of independent items, a group level functionality 842 for presenting information about a related set of items, and an information selection module level functionality for presenting information about a set of items selected by an information selection module 844. The information selection module 844 may also be referred to as a widget and can be, for example, a recommendation widget, a previous browsing widget, and the like.

Each item, group, and widget can include a menu feature 808 that, when interacted with (e.g., hovered over or clicked on), causes the user device 810 to present the option menu 114 in FIG. 1. For instance, images 804A-C of items include menu features 808A-C, group 846 of items includes menu feature 808D, and the information selection module 844 includes menu feature 808E. For the item level functionality 840, interaction with any of the menu features 808A-C followed by a removal selection, can result in the corresponding image being replaced in the GUI 802. For the group level functionality 842, which is illustrated as being a previous browsing widget showing items previously viewed by the user, interaction with the menu feature 808D followed by a removal selection can cause the user device 810 to replace the group 846 with a new group of different items, but not removing this widget. The new group can include other items previously viewed by the user, but that were not included in the group 846. For the information selection module 844, which is illustrated as being a recommended items widget showing items recommended for the user, interaction with the menu feature 808E followed by a removal selection can cause the user device 810 to replace the information selection module 844 with a new item selection module. For example, the recommended items widget may be replaced with a buy again widget of items previously purchased by the user.

The similar item selection or removal selection need be associated with information other than an item. For instance, media (e.g., videos) may be presented at the user device 810. The media may be videos about an item (e.g., how to use, how to select, or other videos) or may be information authored by a content creator (e.g., having a social media account with multiple followers) talking about an item. The user selection can then be received in association with the media requesting either similar media to be presented or the media to be removed or, similarly, requesting similar content creator information (authored by the same or a different content creator) or the content creator information to be removed.

Figure 9:
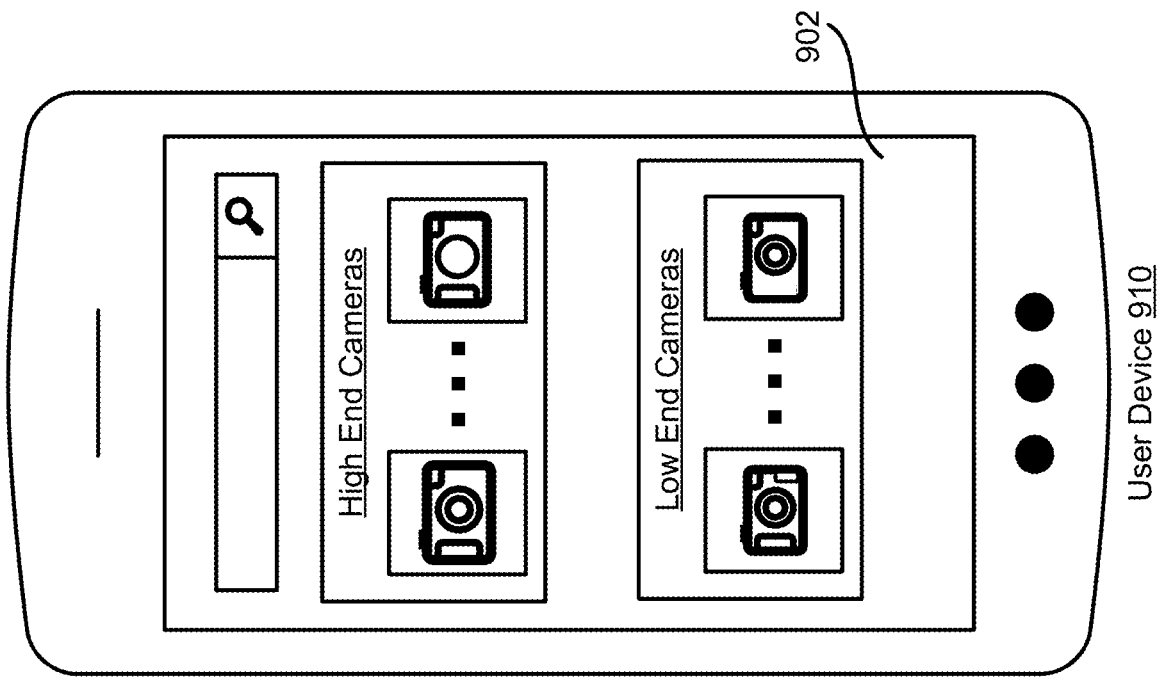
FIG. 9 illustrates an example of funneling similar and removal options at different levels, according to embodiments of the present disclosure.
Figure 9:
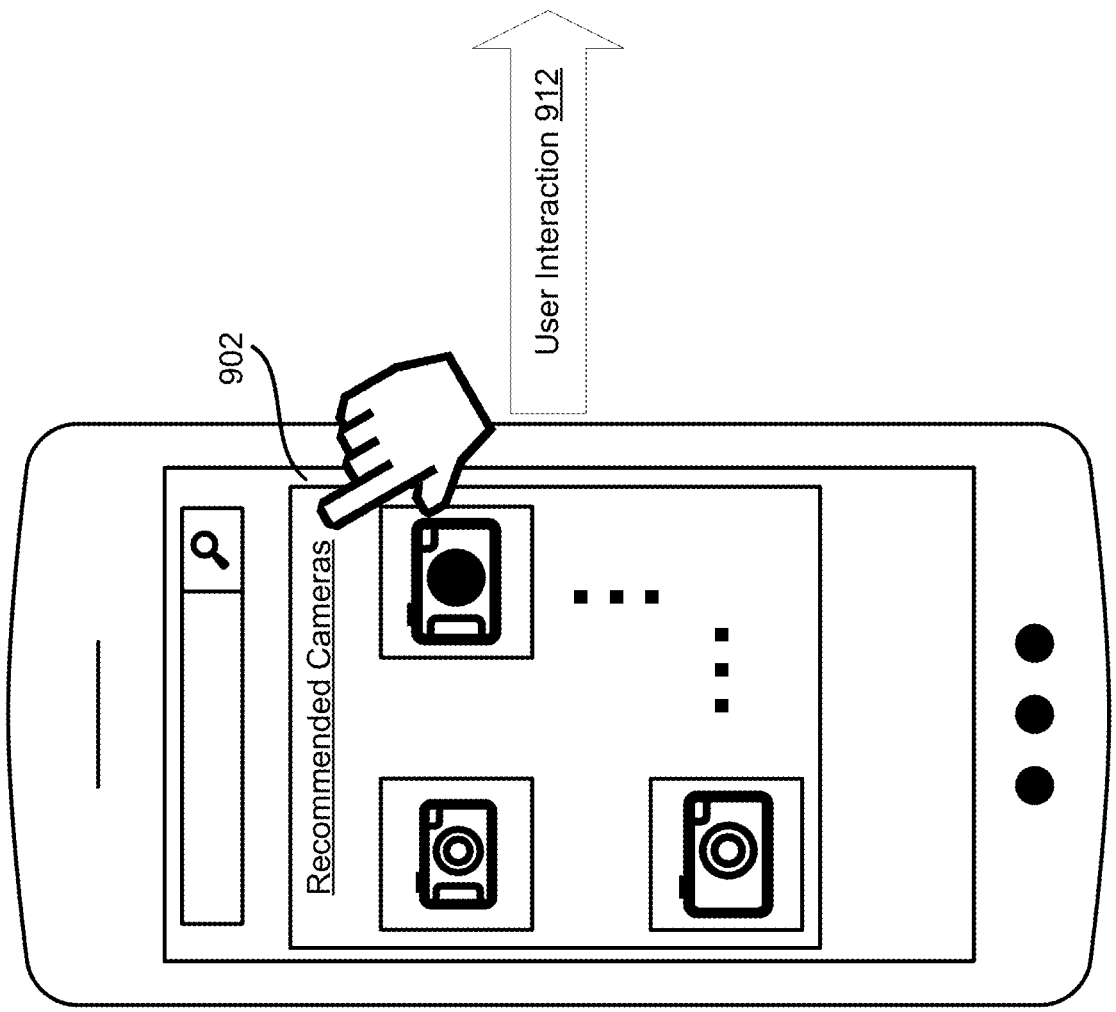

FIG. 9 illustrates an example of funneling similar and removal options at different levels, according to embodiments of the present disclosure. In an example, rather than a user interaction 912 at a user device 910 being received in association with a menu feature (as described in FIG. 8), the user interaction 912 can be via a title of an item, group, or widget. Once the title is interacted with (e.g., clicked or tapped), the user device 910 displays other items, groups, or widgets that can be interacted with to show more similar items, groups, or widgets or to remove the items, groups or widgets. The title can be linked to a network page (a web page) that is displayed by the user device 910 and that presents the other items, groups, or widgets, each with a similar option and/or a removal option. This can continue to a more granular level, where a selection of a similar option can be linked to yet another page that shows yet other items, groups, or widgets, each with a similar option and/or a removal option. For instance, GUI 902 can display a recommender widget for cameras. The user interaction 912 can be provided in association with the title of the widget, which causes the user device 910 to display a new recommendation page with a recommender widget for high end cameras, a recommender widget for low end cameras, a list of cameras (not shown), videos about how to select a cameras (not shown), etc. Each of the recommender widgets, list of items, and videos can have a menu option or some other means to ingress to a next level of granularity for being presented similar items or to remove the recommender widgets, list of items, and videos to the next level. Each level is associated with a concept level, so that presented information can be funneled more and more into deeper levels.

Figure 10:
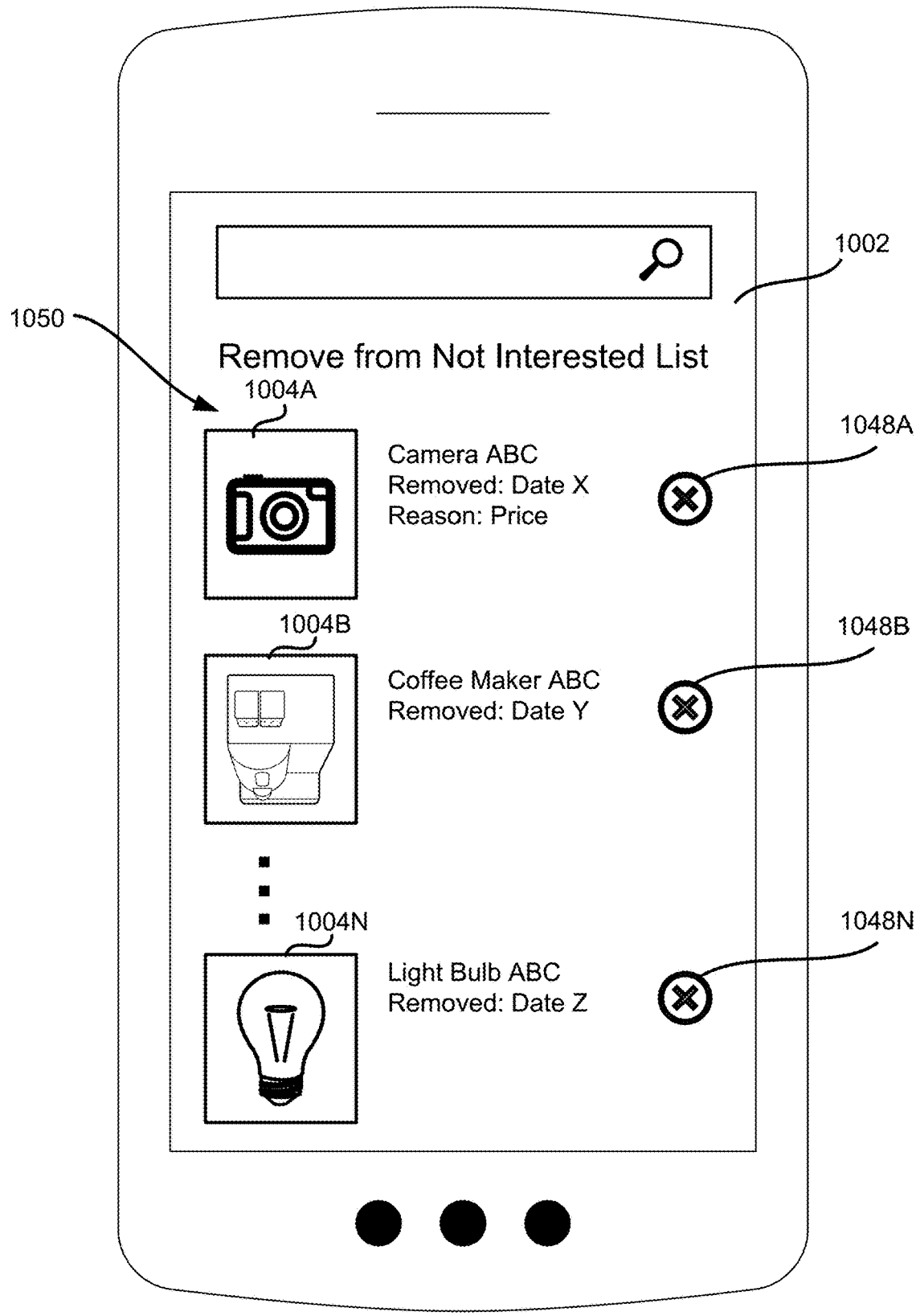
FIG. 10 illustrates an example of a user device presenting a removed items list, according to embodiments of the present disclosure.

FIG. 10 illustrates an example of a user device 1010 presenting a removed items list 1050, according to embodiments of the present disclosure. The removed items list 1050 is associated with a user account. The removed items list 1050 is a list of items for which the user has provided a removal selection, as previously described. At some point in time, the user device 1010 receives a request to view the removed items list 1050. For example, the user can navigate through a GUI 1002 to the removed items list 1050. Based on an identifier of the user account, the user device 1010 can present the removed items list 1050 at the GUI 1002.

As illustrated in FIG. 10, the removed items list 1050 includes images 1004A-N, each corresponding to an item previously added to the removed items list 1050. For instance, the image 1004A is a camera, image 1004B is a coffee maker, and image 1004N is a light bulb. The user device 1010 also presents a removal option 1048 for each of the items on the removed items list 1050. Image 1004A is associated with removal option 1048A, image 1004B is associated with removal option 1048B, and image 1004N is associated with 1048N. The removal option 1048 is selectable to remove the item corresponding to the image 1004 from the removed items list 1050. For example, the user device 1010 may receive a selection of the removal option 1048A for the image 1004A of the camera. In response, the user device 1010 can present an indication that the camera is no longer included in the removed items list 1050, such as by removing the image 1004A from the removed items list 1050.

In an example, the GUI 1002 presenting the removed items list 1050 also includes an indication of dates of the removals of the items and/or reasons for the removals of the items. For instance, the removed items list 1050 can indicate that the camera of the image 1004A was removed on date X because of its price. A timer may be set for each of the items based on the reason of the removal of the items. For example, the camera can remain on the removed items list 1050 for a first period of time based on the removal reason being the price. If no reason is provided for the removal of the item, the item can remain on the removed items list 1050 for a default amount of time. Upon expiration of the timer, the item can be removed from the removed items list 1050.

Figure 11:
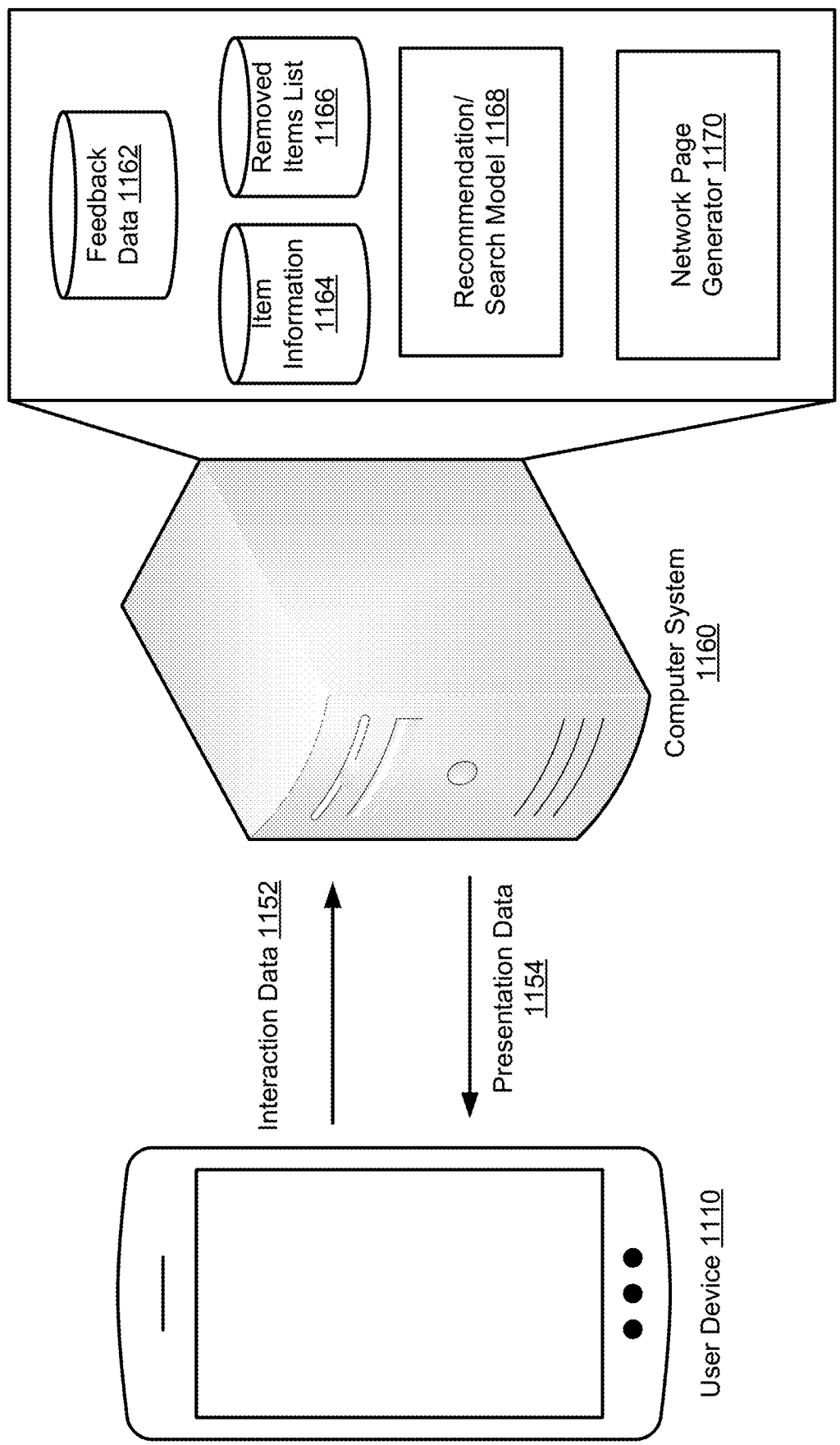
FIG. 11 illustrates an example of a system for customizing a user interface based on user navigational signals, according to embodiments of the present disclosure.

FIG. 11 illustrates an example of a system for customizing a user interface based on user navigational signals, according to embodiments of the present disclosure. User device 1110 can include the user interface and be associated with a user account. The user device 1110 can process user interactions with the user interface to customize the user interface, or a computer system 1160 can process the user interactions to customize the user interface, as described in FIG. 11.

As a user navigates the user interface, interaction data 1152 is generated by the user device 1110 and sent to the computer system 1160. For example, the interaction data 1152 can initially be a request to load a webpage. In response, the computer system 1160 can send presentation data 1154 associated with the webpage. A network page generator 1170 can generate the presentation data 1154 based on the interaction data 1152. In addition, the network page generator 1170 can use item information 1164 and a recommendation/search model 1168 in generating the presentation data 1154. For instance, the network page generator 1070 can use item information 1164 to populate the webpage with information about various items selected to be presented by the recommendation/search model 1168, which is configured to output item recommendations or search results. The recommendation/search model 1168 can look up the item information 1164, determine a ranking of the items, and then select which items to present.

A removed items list 1166 can be a data store that stores key-value pairs indicating items for which the user has provided removal selections. A key of the key-value pair can be an identifier (ID) of the user account associated with the user device 1110 and a value of the key-value pair can be an identifier of an item. For instance, if the interaction data 1152 indicates that the user performed an interaction associated with requesting a removal of a camera, the computer system 1160 can store the user account ID and an identifier of the camera in the removed items list 1166. As the network page generator 1170 generates the presentation data 1154, the recommendation/search model 1168 can send a query to the removed items list 1166 and receive a query result including that the identifier of the camera and identifiers of other removed items. As a result, the recommendation/search model 1168 can select items to present that do not include the camera or the other removed items. The recommendation/search model 1068 sends an indication of the selected items to the network page generator 1170, which generates the presentation data 1154 based on the selected items.

The recommendation/search model 1168 may additionally determine similar items to present in response to a similar item selection based on the removed items list 1166. For instance, after receiving the interaction data 1152 indicating a request for similar items to a particular item, the recommendation/search model 1168 can determine that another item that is similar to the particular item is included in the removed items list 1166. So, the recommendation/search model 1168 can exclude the other item from the similar items that are to be presented.

In an example, the removed items list 1166 also includes reasons of the removals of the items. The interaction data 1152 can indicate the reason of the removal, as selected by the user. Along with the identifier of the item, the computer system can also store the reason in the removed items list 1166. The reason may be usable by the recommendation/search model 1168 when selecting items for presentation. For example, a value of a timer associated with a removed item may be set, and the item can remain in the removed items list 1166 until an expiration of the timer. Prior to the expiration of the timer, the recommendation/search model 1168 may indicate that the item is to be presented at the user device 1110, but since the item is in the removed items list 1166, the recommendation/search model 1168 can determine that the item is to be excluded from the presentation.

The recommendation/search model 1168 may generate the ranking of the items based on the reasons for the removals. For example, an item removed because of its price may be ranked higher than an item removed for being offensive. The recommendation/search model 1068 can then output items that are to be presented based on the ranking. For instance, the fifty highest ranked items may be selected for presentation.

A timing of the item removal or a frequency at which an item is requested to be removed can be stored in association with the removed items list 1166. The recommendation/search model 1168 can generate the ranking of the items based on the timing or frequency of item removal. For example, recently removed items or more frequently removed items can be ranked lower than less recently or less frequency removed items. So, more recently removed items or more frequently removed items may not be presented at the user device 1110.

A data store of feedback data 1162, which corresponds to positive and negative signals associated with items based on the interaction data 1152, can also be used in the generation of the presentation data 1154. For instance, the interaction data 1152 including a request for presentation of similar items may be a positive signal, and the interaction data 1152 including a request for removal of an item may be a negative signal. The feedback data 1162 can include an indication of one or more requests for similar item information and one or more requests for item information removal. Based on the feedback data 1162, the recommendation/search model 1168 can generate the ranking of the items and select items to present at the user device 1110. For instance, a consistent request for similar items associated with a similar category of items (e.g., lamps, chairs, laptops, etc.) can result in items of the category being ranked higher. Alternatively, a consistent request for item removal associated a similar category of items can result in items of the category being ranked lower.

The feedback data 1162 can include data associated with the user account of the user device 1110, as well as data associated with other user accounts. The computer system 1160 may determine that there is an issue with an item based on the aggregated feedback data. For instance, a consistent removal selection across user accounts for an item may indicate that there is an issue with an item. The aggregated feedback data may additionally be usable to determine that a particular group of items or a widget is consistently associated with negative feedback, and therefore should not be presented.

Figure 12:
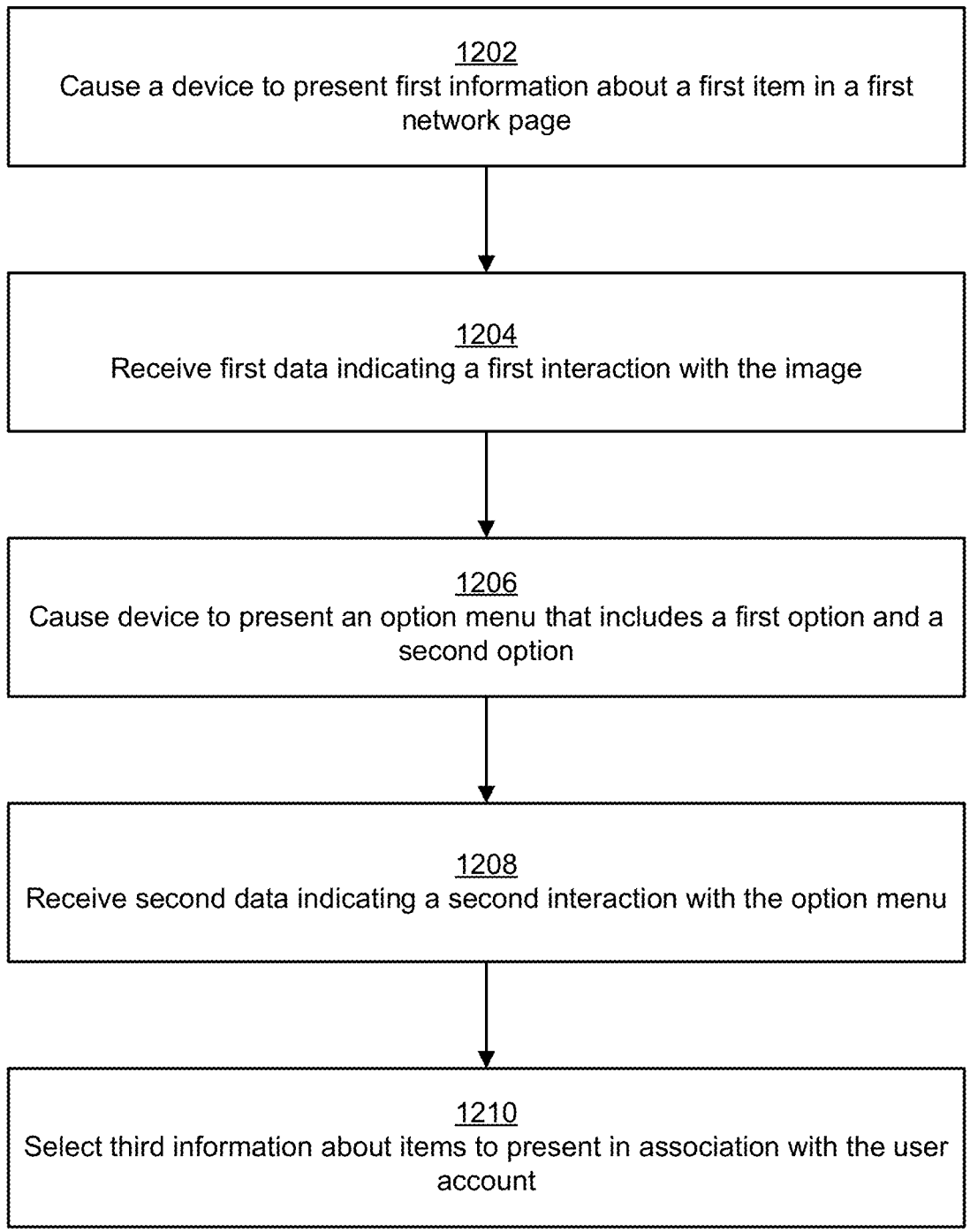
FIG. 12 illustrates an example of a flow for customizing a user interface based on user navigational signals, according to embodiments of the present disclosure.
Figure 13:
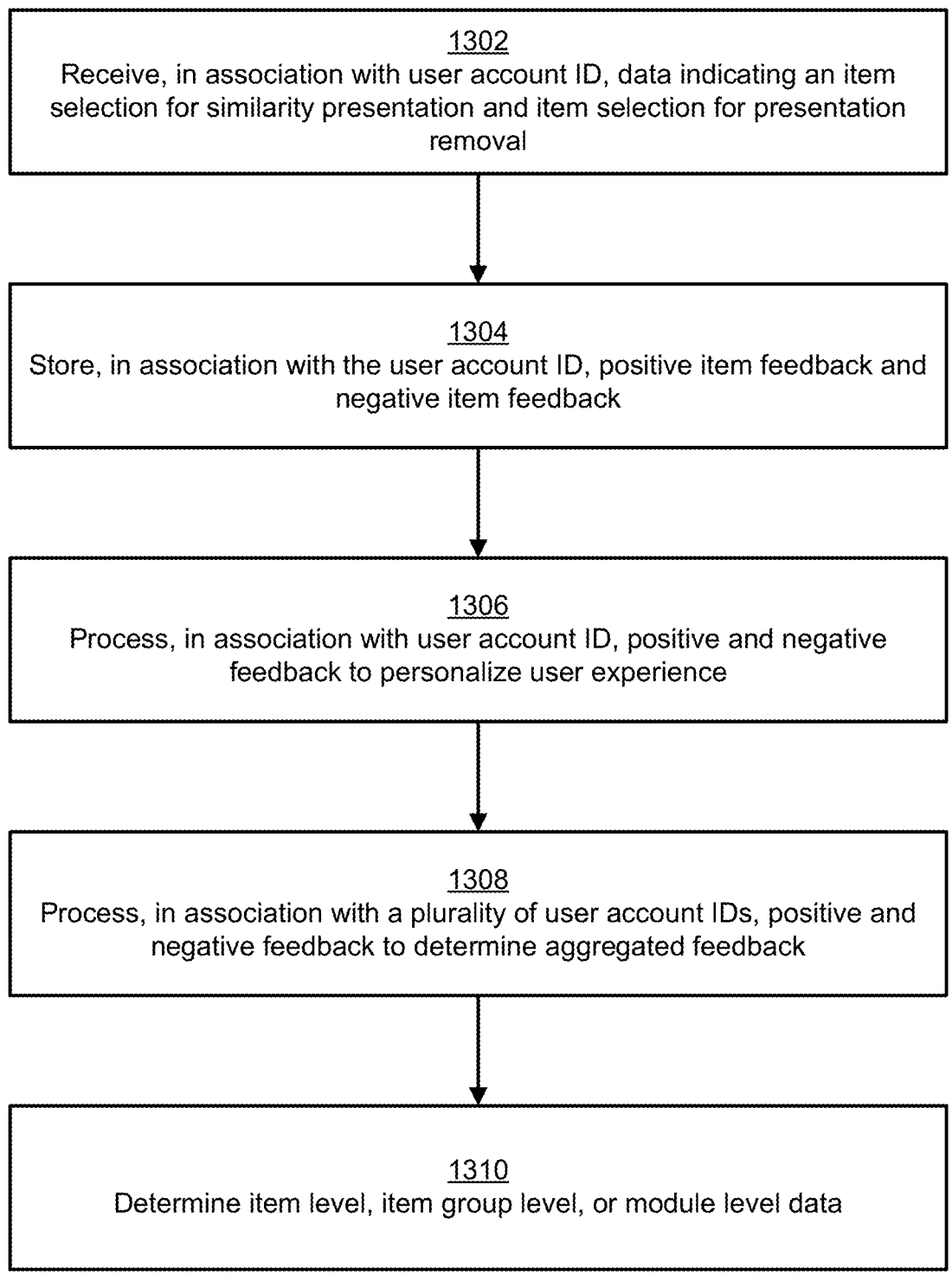
FIG. 13 illustrates an example of a flow for receiving and using feedback data for multiple user accounts, according to embodiments of the present disclosure.
Figure 14:
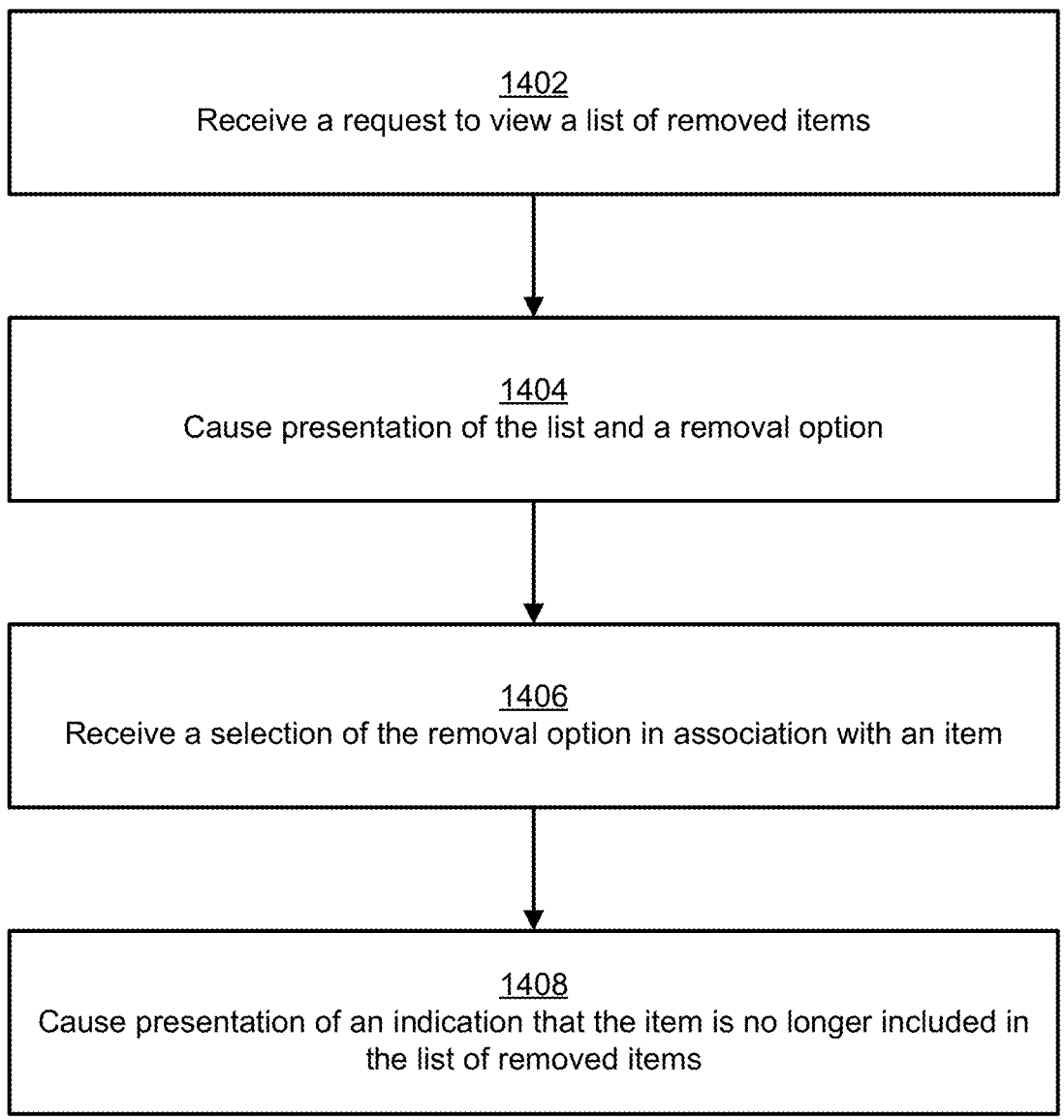
FIG. 14 illustrates an example of a flow for displaying and managing a removed items list, according to embodiments of the present disclosure.

FIGS. 12-14 illustrate example flows for processes associated with user interface customization based on user navigational signals. Operations of the flows can be performed by a computer system, such as the computer system 1160. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 12 illustrates an example of a flow for customizing a user interface based on user navigational signals, according to embodiments of the present disclosure. In an example, the flow includes operation 1202, where the computer system causes a device to present first information about a first item in a first network page. The device is associated with a user account. The first information about the first item is presented at a GUI of the device. The first information about the first item can be an image of the first item. For instance, the first information can be the image 104A of the camera in FIG. 1.

In an example, the flow includes operation 1204, where the computer system receives first data indicating a first interaction with the image. The first data is received from the device. As an example, the first data may indicate an interaction with a menu feature of the image, a long press on the image, or a swipe of the image in a particular direction.

In an example, the flow includes operation 1206, where the computer system causes the device to present an option menu that includes a first option and a second option. The option menu is presented at the GUI and in association with the image based on the first data. The first option is selectable to request information about a set of items similar to the first item, and the second option selectable to request a removal of the presentation of the first information.

In an example, the flow includes operation 1208, where the computer system receives second data indicating a second interaction with the option menu. Upon determining that the second interaction is with the first option for requesting information about a set of similar items, the computer system can cause the device to present a first modal window, such as a bottom action sheet, over the first network page. The first modal window can show the first information about the first item and at least second information about a second item of the set of items. The first modal window is described in FIGS. 3 and 4. Alternatively, upon determining that the second interaction is with the second option, the computer system can cause the device to remove the first information from being presented in the first network page. The computer system can also cause the device to present a second modal window over the first network page. The second modal window can request a removal reason. The second modal window is described in FIGS. 5 and 6. The computer system can also include a first identifier of the first item in a list of removed items that is associated with the user account. The list of removed items is described in FIG. 10.

In an example, the flow includes operation 1210, where the computer system selects third information about items to present in association with the user account. For example, a recommendation/search model can rank items that are similar to the first item to select items to present in response to the second interaction being for the first option. Alternatively, the recommendation/search model can rank and select items to replace the first item in response to the second interaction being for the second option.

FIG. 13 illustrates an example of a flow for receiving and using feedback data for multiple user accounts, according to embodiments of the present disclosure. In an example, the flow includes operation 1302, where the computer system receives, in association with a user account ID, data indicating an item selection for similarity presentation and an item selection for presentation removal. The data can be feedback data, such as feedback data 1162 in FIG. 11. A user can provide interactions at a user device associated with the user account for the item selection for similarity selection and the item selection for presentation removal. Data associated with the interactions can then be sent to and received by the computer system.

In an example, the flow includes operation 1304, where the computer system stores, in association with the user account ID, positive item feedback and negative item feedback. The positive item feedback can be the data indicating the item selection for similarity presentation and the negative item feedback can be the data indicating the item selection for presentation removal. The positive item feedback and the negative item feedback may be stored in a data store that includes positive item feedback and the negative item feedback for multiple user accounts.

In an example, the flow includes operation 1306, where the computer system processes, in association with the user account ID, the positive and negative feedback to personalize the user experience. For instance, the positive item feedback may be used by the computer system to more frequently present items similar to the item selected for the similarity presentation. Alternatively, the negative item feedback may be used by the computer system to less frequently present items similar to the item selected for presentation removal.

In an example, the flow includes operation 1308, where the computer system processes, in association with a plurality of user account IDs, the positive and negative feedback to determine aggregated feedback data. The positive item feedback and the negative item feedback can be included in the data store with data for multiple user accounts to generate the aggregated feedback data. The aggregated feedback data can indicate an entirety of interactions with an item performed in association with the multiple user accounts.

In an example, the flow includes operation 1310, where the computer system determines item level, item group level, or module level data. For example, the computer system may determine favorable items, groups, or modules based on the aggregated feedback data indicating more positive feedback than negative feedback for the items, groups, or modules. Or, the computer system may determine items, groups, or modules that are undesirable or have issues based on the aggregated feedback data indicating more negative feedback than positive feedback for the items, groups, or modules.

FIG. 14 illustrates an example of a flow for displaying and managing a removed items list, according to embodiments of the present disclosure. In an example, the flow includes operation 1402, where the computer system receives a request to view a list of removed items. A user can perform an interaction at a GUI if a device that corresponds to the request to view the list of removed items. For example, the user may select hyperlinked text of "Removed Items List" that, when selected, takes the user to a webpage displaying the list of removed items.

In an example, the flow includes operation 1404, where the computer system causes a presentation of the list and a removal option. Based on the request, the computer system can send a query that includes an identifier of a user account associated with the device to a data store. The computer system can then receive a query result that includes identifiers of the removed items included in a data structure that represents the list of removed items. Based on the query result, the computer system causes the device to preset the list of removed items and a removal option.

In an example, the flow includes operation 1406, where the computer system receives a selection of the removal option in association with an item. For instance, the selection may be a click on a GUI feature that is selectable to cause the item to be removed from the removed items list. Data indicating the selection can be received by the computer system.

In an example, the flow includes operation 1408, where the computer system causes presentation of an indication that the item is no longer included in the list of removed items. The indication can be a removal of the item from the list of removed items being presented at the GUI of the device. The item can then be included in recommendation or search results that are presented by the device.

Figure 15:
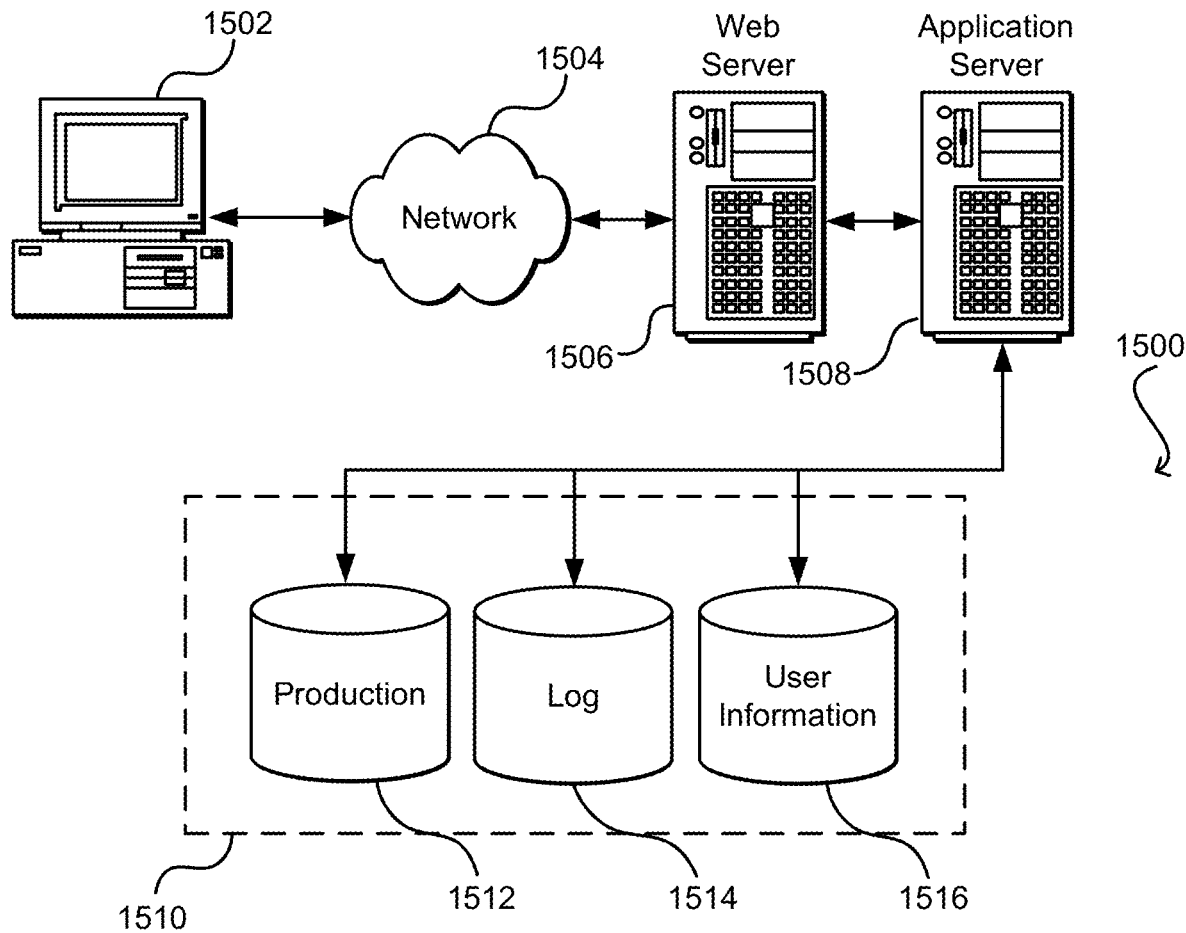
FIG. 15 illustrates aspects of an example environment for implementing aspects in accordance with various embodiments.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C #, or C++, or any scripting language, such as Perl, Python, or TCL, as well as combinations thereof. The server(s) may also include database servers, including without limitation those commercially available from Oracle©, Microsoft*, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more processors; and
   one or more memory storing computer-readable instructions that, upon execution by the one or more processors, configure the system to:
   cause a device to present, at a graphical user interface (GUI) of the device, first information about a first item in a first network page, the first information comprising an image of the first item, the device associated with a user account;
   receive, from the device, first data indicating a first interaction with the image;

cause, based at least in part on the first data, the device to present, at the GUI and in association with the image, an option menu that comprises a first option and a second option, the first option selectable to request information about a set of items associated with the first item, the second option selectable to request a removal of the presentation of the first information;

receive, from the device, second data indicating a second interaction with the option menu, wherein:

upon determining that the second interaction is with the first option, causing the device to present a first modal window over the first network page, the first modal window showing the first information about the first item and at least second information about a second item of the set of items, and upon determining that the second interaction is with the second option, (i) causing the device to remove the first information from being presented in the first network page and to present a second modal window over the first network page, the second modal window requesting a removal reason, and (ii) including a first identifier of the first item in a list of removed items, the list associated with the user account; and select, based at least in part on the second data, third information about items to present in association with the user account.

2. The system of claim 1, wherein the one or more memory store further computer-readable instructions that, upon execution by the one or more processors, further configure the system to:

receive, from the device, third data indicating a request to view the list of removed items;

send, to a data store, a query that includes an identifier of the user account;

receive, from the data store, a query result that includes identifiers of the removed items included in a data structure that represents the list;

cause, based at least in part on the query result, the device to present the list and a third removal option;

receive, from the device, fourth data indicating a selection of the third removal option in association with the first item;

cause, based at least in part on the fourth data, the data store to remove a first identifier of the first item from the data store; and cause the device to present an indication that the first item is no longer included in the list of removed items.

3. The system of claim 1, wherein the one or more memory store further computer-readable instructions that, upon execution by the one or more processors, further configure the system to:

provide identifiers of removed items included in the list to a model configured to output item recommendations or search results; and receive the third information based at least in part on an output of the model.

4. The system of claim 1, wherein the first modal window pins the first information at a first predefined location within the first modal window and shows a third filter option to filter one or more of the items similar to the first item, wherein the third filter option is based at least in part on a characteristic of the first item.

5. A computer-implemented method comprising:

causing a device to present first information associated with a first item in a first network page, the device associated with a user account;

receiving, from the device, first data indicating a first interaction with at least a portion of the first information;

determining, based at least in part on the first data, whether the first interaction corresponds to a first request for information about a set of items associated with the first item or to a second request for a removal of the presentation of the first information;

based at least in part on determining that the first interaction corresponds to the first request, causing the device to present a second network page that shows the first information and second information associated with a second item of the set of items; and based at least in part on determining that the first interaction corresponds to the second request, (i) causing the device to remove the first information from being presented in the first network page, and (ii) including a first identifier of the first item in a list of removed items, the list associated with the user account.

6. The computer-implemented method of claim 5, further comprising:

receiving, from the device and prior to receiving the first data, second data indicating a second interaction with an image of the first item, the image included in the first information shown in the first network page;

causing, the device based at least in part on the second data, to present a first option and a second option, the first option selectable to make the first request, and the second option selectable to make the second request;

based at least in part on determining that the first interaction corresponds to the second request, further causing the device to present a first modal window over the first network page, wherein the first modal window requests a removal reason and is presented over the first network page, and wherein the second network page is a second modal window presented over the first network page; and selecting, based at least in part on the first data, third information about items to present in association with the user account.

7. The computer-implemented method of claim 5, further comprising:

receiving, from the device, second data indicating a request to view the list of removed items;

cause, based at least in part on the second data, the device to present the list;

receive, from the device, third data indicating a request to remove an item identified in the list; and cause the device to present an indication that the item is no longer included in the list.

8. The computer-implemented method of claim 5, further comprising:

causing, based at least in part on the second request, the device to replace, at a graphical user interface location where the first item is shown, the first information with third information associated with a third item.

9. The computer-implemented method of claim 5, further comprising:

causing, based at least in part on the first request, the device to pin a presentation of the first information at a predefined location in the second network page.

10. The computer-implemented method of claim 5, further comprising:
  storing, in a data store, a key-value pair indicating that the first item is included in the list, wherein a key of the key-value pair is an identifier of the user account, and wherein a value of the key-value pair is an identifier of the first item;
  determining a request for a network page access, wherein the request is associated with the user account;
  querying the data store based at least in part on the identifier of the key-value pair;
  determining that the first item is included in the list based at least in part on a query result of the data store, wherein the query result includes the identifier of the first item; and
  selecting third information about items to present in response to the network page access, the third information excluding the first information.

11. The computer-implemented method of claim 5, further comprising:
  causing the device to present an option to remove a presentation of third information about a first group of items in the first network page; and
  causing, based at least in part on a selection of the option, the device to replace the presentation of the third information with a presentation of fourth information about a second group of items in the first network page.

12. The computer-implemented method of claim 5, further comprising:
  causing the device to present an option to remove a presentation of third information generated by a first information selection module; and
  causing, based at least in part on a selection of the option, the device to replace the presentation of the third information with a presentation of fourth information generated by a second information selection module.

13. One or more non-transitory computer-readable storage media storing instructions that, upon execution on a system, cause the system to perform operations comprising:
  causing a device to present first information associated with a first item in a first network page, the device associated with a user account;
  receiving, from the device, first data indicating a first interaction with at least a portion of the first information;
  determining, based at least in part on the first data, whether the first interaction corresponds to a first request for information about a set of items associated with the first item or to a second request for a removal of the presentation of the first information;
  based at least in part on determining that the first interaction corresponds to the first request, causing the device to present a second network page that shows the first information and second information associated with a second item of the set of items; and
  based at least in part on determining that the first interaction corresponds to the second request, (i) causing the device to remove the first information from being presented in the first network page, and (ii) including a first identifier of the first item in a list of removed items, the list associated with the user account.

14. The one or more non-transitory computer-readable storage media of claim 13 storing further instructions that, upon execution on the system, cause the system to perform further operations comprising:
  causing the device to present a third request for a reason of the removal;
  receiving, from the device, second data indicating the reason; and
  storing, in a data store, an identifier of the first item and the second data.

15. The one or more non-transitory computer-readable storage media of claim 14 storing additional instructions that, upon execution on the system, cause the system to perform additional operations comprising:
  setting, based at least in part on the reason, a value of a timer associated with the first item, wherein the item remains on the list until an expiration of the timer.

16. The one or more non-transitory computer-readable storage media of claim 14 storing additional instructions that, upon execution on the system, cause the system to perform additional operations comprising:
  generating, based at least in part on the reason, a ranking of items;
  determining a request for a network page access, wherein the request is associated with the user account; and
  selecting, based at least in part on the ranking, third information about items to present in response to the network page access.

17. The one or more non-transitory computer-readable storage media of claim 13 storing further instructions that, upon execution on the system, cause the system to perform further operations comprising:
  storing second data in association with the list, wherein the second data comprises at least one of: a timing of the second request or a frequency at which the first information is requested to be removed;
  generating, based at least in part on the second data, a ranking of items;
  determining a request for a network page access, wherein the request is associated with the user account; and
  selecting, based at least in part on the ranking, third information about items to present in response to the network page access.

18. The one or more non-transitory computer-readable storage media of claim 13 storing further instructions that, upon execution on the system, cause the system to perform further operations comprising:
  storing second data in association with the user account, wherein the second data indicates one or more requests for similar items information and one or more requests for item information removal;
  generating, based at least in part on the second data, a ranking of items;
  determining a request for a network page access, wherein the request is associated with the user account; and
  selecting, based at least in part on the ranking, third information about items to present in response to the network page access.

19. The one or more non-transitory computer-readable storage media of claim 13, wherein the first interaction is associated with one of: (i) a first title associated with the first item, (ii) a second title associated with a first group of items comprising the first item, or (iii) a third title associated with an information selection module comprising the first item, wherein the first title, the second title and the third title are linked to a third network page.

20. The one or more non-transitory computer-readable storage media of claim 19 storing further instructions that, upon execution on the system, cause the system to perform further operations comprising:
  causing the device to present third information associated with the first item, the first group of items, or the information selection module in the third network page based on the first interaction, the third information comprising more granular information than the first information and having a first option selectable to request information about a set of items associated with the third information and a second option selectable to request a removal of the presentation of the third information.

* * * * *